United States Patent [19]

Rasmussen et al.

[11] Patent Number: 5,164,707
[45] Date of Patent: * Nov. 17, 1992

[54] DETECTION SYSTEM FOR SAFETY EQUIPMENT

[75] Inventors: Steen B. Rasmussen, Lynge, Denmark; Richard Salisbury, Laguna Niguel, Calif.

[73] Assignee: Cabot Safety Corporation, Southbridge, Mass.

[ * ] Notice: The portion of the term of this patent subsequent to Jun. 11, 2008 has been disclaimed.

[21] Appl. No.: 662,303

[22] Filed: Feb. 28, 1991

Related U.S. Application Data

[63] Continuation-in-part of Ser. No. 486,537, Feb. 28, 1990, Pat. No. 5,023,597.

[51] Int. Cl.$^5$ ............................................. G08B 13/14
[52] U.S. Cl. ................................. 340/572; 250/221; 340/551; 340/556; 340/573; 367/189
[58] Field of Search ............. 340/572, 551, 556, 573, 340/565–566; 250/221; 367/140, 189

[56] References Cited

U.S. PATENT DOCUMENTS

| | | | |
|---|---|---|---|
| 3,573,817 | 4/1971 | Akers | 340/551 X |
| 4,041,497 | 8/1977 | Palmaer | 343/702 |
| 4,665,385 | 5/1987 | Henderson | 340/539 |
| 4,673,923 | 6/1987 | Boscoe et al. | 340/572 |
| 4,684,933 | 8/1987 | Dill | 340/572 |
| 4,692,747 | 8/1987 | Wolf | 340/572 |
| 4,709,330 | 11/1987 | Yokoi et al. | 364/400 |
| 4,728,938 | 3/1988 | Kaltner | 340/572 |
| 4,835,524 | 5/1989 | Lamond et al. | 340/572 |
| 5,023,597 | 6/1991 | Salisbury | 340/572 |

FOREIGN PATENT DOCUMENTS

| | | |
|---|---|---|
| 315488 | 6/1989 | European Pat. Off. . |
| 3515445 | 10/1986 | Fed. Rep. of Germany ...... 340/568 |
| 2215421 | 9/1989 | United Kingdom . |

Primary Examiner—Jin F. Ng
Assistant Examiner—Thomas J. Mullen, Jr.
Attorney, Agent, or Firm—Michelle B. Lando

[57] ABSTRACT

A detection system for monitoring safety equipment being worn by an individual for whom the wearing of such equipment is mandatory. The detection system is more specifically directed to individuals who are passing through an entryway into a designated area which requires the wearing of the equipment, and also to operators of machinery which require the same. In one embodiment, the detection system includes an infrared reflector which is fixed to a designated piece of equipment, for example, safety eyewear, an infrared transmitter and an infrared receiver which are located at one side of an entryway to the designated area and an alarm system which is activated when a person who is not wearing the specified equipment attempts to pass through the entryway into the designated area. In another embodiment, the detection system includes a teleloop mounted onto an entryway which emits a telemagnetic field, a signal generating means which supplies the signal to the teleloop at a pre-selected frequency, a ferromagnetic transducer which is located on the safety equipment and vibrates when exposed to the telemagnetic field to generate tone, and a sound receiving means which will receive the tone generated from the vibration of the transducer membrane. In this embodiment, an alarm is activated when no transducer produced tone is received by the sound receiving means.

61 Claims, 8 Drawing Sheets

DETECTION SYSTEM FOR SAFETY EQUIPMENT

This application is a continuation-in-part of commonly assigned, copening application Ser. No. 07/486,537, filed on Feb. 28, 1990, entitled "Detection Apparatus for Safety Eyewear", now issued as U.S. Pat. No. 5,023,597 on Jun. 11, 1991.

TECHNICAL FIELD

The present invention relates generally to a detection system for monitoring specified safety equipment being worn by individuals for whom the wearing of such equipment is required in certain circumstances. The invention is specifically directed to the system for detecting specified safety equipment being worn by persons who are passing through an entryway into a designated area which requires those persons in the area to be wearing the specified safety equipment and for sounding an alarm when the specified equipment is not detected on a person who is passing through the entryway into the designated area. The invention is also specifically directed to a detection system for preventing the starting of electrically driven machinery by a person who is not wearing the designated safety equipment for that machine when attempting to start the machine.

BACKGROUND OF THE INVENTION

Many types of detection systems have been developed for detecting persons who are approaching or passing through entryways to specified areas. More specifically, detection systems have been developed for discriminating between persons who are authorized to enter a specified area and those who are not. For example, U.S. Pat. No. 4,684,933 to Dill discloses a system which discriminates between a person who is wearing a small metal object and a person who is not. Unfortunately, this system can only be used in circumstances where the wearing or not wearing of a small metal object is tightly controlled, such as in certain types of institutions.

Another type of detection system provides a warning if the fastener of a garment which is worn by a person is not properly fastened in an environment where the fastener must be closed to ratify safety or sanitary requirements. Unfortunately, none of the prior art detection systems are directed to monitoring safety equipment compliance or capable of detecting or distinguishing, for example, safety eyewear from conventional eyewear. Typically, the monitoring of the wearing of specified safety equipment by persons entering a designated area or for operating a designated machine is accomplished by visual manual inspection. In this scenario, a full time guard or supervisor must be employed at the entryway to a designated area or within the facility itself to supervise the work area. Only by maintaining constant visual view with the workers is it possible to ensure that all types of safety equipment are worn by machine operators. In spite of extensive education and training on the proper use of safety equipment and the threat of disciplinary action for noncompliance with safety policies, violations of safety policies continue to occur throughout industry. These violations inevitably lead to serious injuries, typically to the face and eyes. The slight inconvenience of wearing proper safety equipment is a small price to pay to avoid the pain, suffering and loss of production for an individual who had sustained an injury due to the failure to wear proper safety equipment. Even if the individual is conscientious about using proper safety eyewear under most circumstances, this is all negated when an injury occurs during one careless moment when a person forgets to wear his or her safety equipment when entering a designated area, is in a hurry, or only intends to stay in the designated area for a short time.

These and other difficulties experienced with the use of safety equipment in industry have been obviated by the present invention.

It is, therefore, a principal object of the invention to provide an automatic detection system for safety equipment which will sound an alarm or similar warning signal when a person who is not wearing the specified eyewear attempts to enter a designated area within which use of such equipment is required by law or by company standards.

Another object of this invention is to provide for an automatic detection system for safety equipment which will detect the wearing of specified safety equipment by persons of different heights who are entering a designated area within which use of such equipment is required.

A further object of the present invention is the provision of an automatic detection system for specified safety equipment which is being worn by a person who is operating an electrically driven machine for which the wearing of specified safety equipment is required when operating the machine.

It is another object of the present invention to provide an automatic detection system for specified equipment which is being worn by a person who is operating an electrically driven machine which prevents the machine from being started by a person who is not wearing the safety equipment which is specified for that machine.

A still further object of the invention is the provision of an automatic detection system for safety equipment which is being worn by a person who is operating an electrically driven machine which cannot be started by a person who is not wearing the specified equipment and which will automatically shut off when that person leaves the machine.

With these and other objects in view, as will be apparent to those skilled in the art, the invention resides in the combination of parts set forth in the specification and covered by the claims appended hereto.

DISCLOSURE OF INVENTION

The present invention is directed to a detection system for monitoring specified safety equipment being worn by a person who is entering a designated area which requires the wearing of such equipment.

In one embodiment, the detection system comprises an infrared reflector which is fixed to a designated piece of equipment, for example, safety eyewear, an infrared transmitter and an infrared receiver which are located at one side of an entryway to the designated area and an alarm system which is activated when a person who is not wearing the specified equipment attempts to pass through the entryway into the designated area. When a person who is wearing the specified safety equipment enters the entryway, infrared radiation from the transmitter will be reflected back to the receiver from the infrared reflector of the specified equipment so that the alarm which is controlled by the receiver will not be activated.

The present invention also consists of a detection system for monitoring specified safety equipment being worn by a person who is located at a designated position for operating an electrically driven machine which requires the wearing of the such equipment during the operation of a machine. The detection system in this embodiment comprises an infrared reflector on the specified equipment, an infrared transmitter which directs infrared radiation toward the position which is being occupied by the machine operator, an infrared receiver which is located adjacent the infrared transmitter, and control circuitry for the machine which is operatively connected to the transmitter and receiver so that the machine can only be operated by a person who is wearing the specified safety equipment.

Another embodiment of the detection system of the present invention comprising a teleloop mounted onto an entryway which emits an telemagnetic field, a signal generating means which supplies the signal to the teleloop at a pre-selected frequency, a ferromagnetic transducer which is located on the safety equipment and vibrates when exposed to the telemagneticfield to generate tone, and a sound receiving means which will receive the tone generated from the vibration of the transducer membrane. In this embodiment, an alarm is activated when no transducer produced tone is received by the sound receiving means.

In another embodiment, the detection system comprising a transducer which is located on one side of an entryway for emitting a radiation wave of a pre-selected frequency toward the opposite side of the entryway, and a resonator which is located on the safety equipment, the resonator comprising a ceramic crystal that is tuned to resonate at the same pre-selected frequency as the radiation wave to generate a tone. The tone generated from the resonating crystal is received by a sound receiving means. Again, as in previous embodiments, an alarm is activated when no resonating produced tone is received by the sound receiving means, thus indicating that an individual was not wearing the proper safety equipment.

The present invention is also directed to safety equipment for use in the detection systems as described above.

MODE(S) OF CARRYING OUT THE INVENTION

Figure 1:
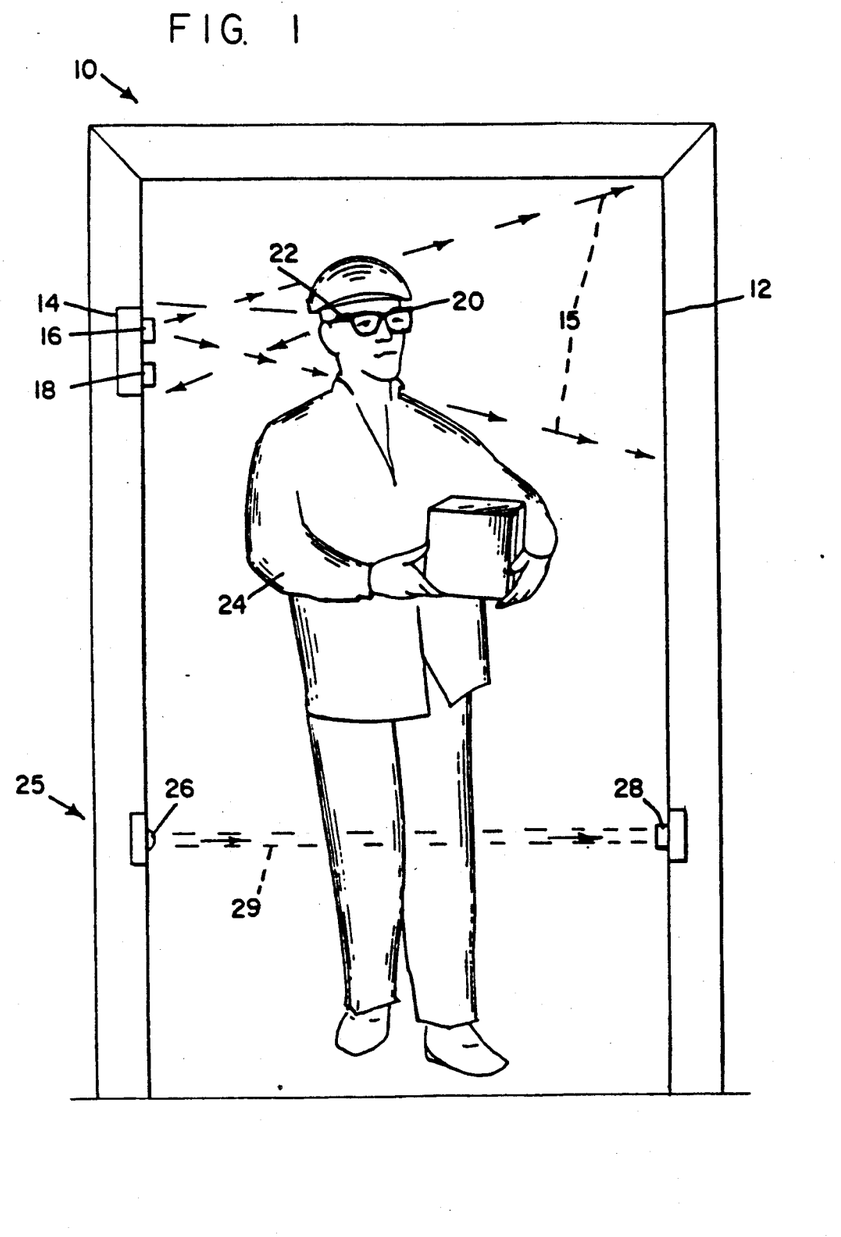
FIG. 1 is a front elevational view showing a person in an entryway which is equipped with the safety equipment detection system of a first embodiment the present invention.
Figure 2:
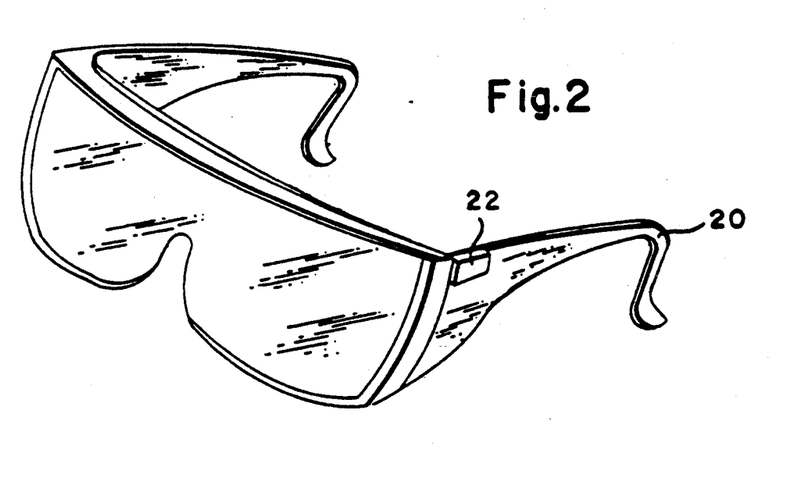
FIG. 2 is a perspective view of an example of safety equipment which is equipped with an infrared reflector which forms part of the detection system of the present invention.
Figure 3:
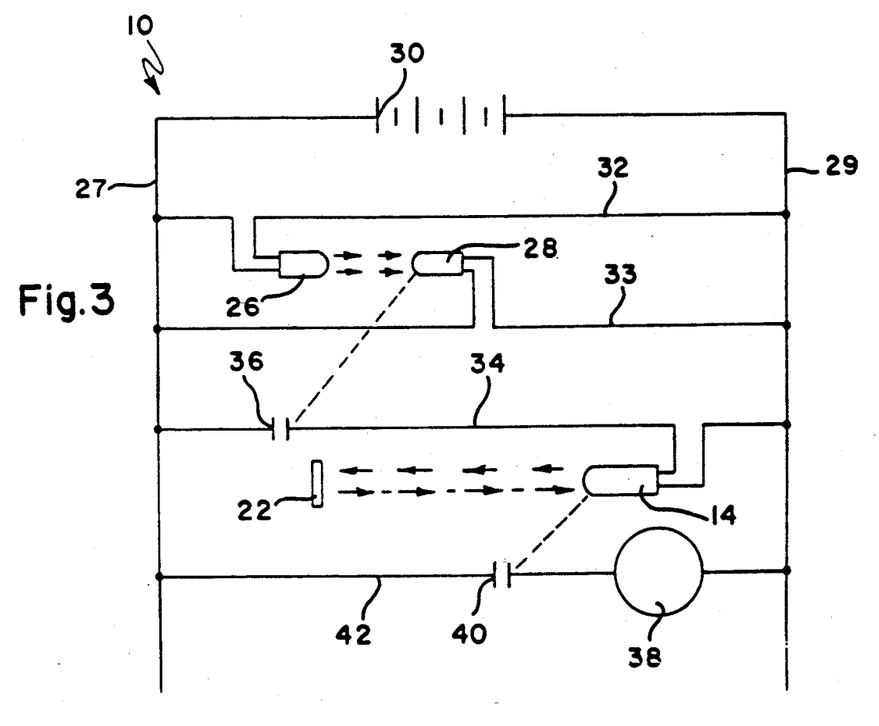
FIG. 3 is an electrical diagram of the electrical controls for the detection system of the first embodiment present invention.

Referring first to FIGS. 1-3, there is shown a first embodiment of a detection system of the present invention which is generally indicated by the reference numeral 10. The detection system 10 is shown applied to an entryway 12 and comprises a transceiver 14 which is mounted on one side of the entryway 12. For purposes of illustration, the transceiver 14 in this first embodiment includes an infrared transmitter 16 which transmits a spreading beam 15 of infrared radiation to the opposite side of the entryway and an infrared receiver 18. The detection system 10 also includes an electronic sensor, generally indicated by the reference numeral 25 for sensing the presence of a person in the entryway 12. The sensor 25 comprises a lamp 26 at one side of the entryway 12 and a photo receptor 28 at the opposite side of the entryway 12 for receiving a beam of light from the lamp 26. The photo receptor 28 is actuated when the beam of light, indicated by the reference numeral, 29 from the lamp 26 is interrupted when a person, indicated by the reference numeral 24, passes through the entryway 12. Other commercially available motion detection systems, including infrared sensitive plastic foils, may also be utilized.

The detection system 10 also includes an infrared reflector 22 which is mounted onto the protective safety equipment, and in this instance, on the frame of the protective eyewear 20 which is shown being worn by a person such as that which is worn by the individual 24 who is depicted in FIG. 1. In this embodiment of the detection system of the present invention, only the proper safety equipment, e.g. the safety eyewear shown in FIG. 1, which is specified for a designated area will contain the infrared reflector 22. When a person enters this designated area through the entryway 12, infrared radiation from the transmitter 16 will strike the infrared reflector 22 and will be reflected back to the infrared receptor 18. If the sensing means 25 senses a person in the entryway 12 and that person does not have proper safety eyewear which contains the infrared reflector 22, infrared radiation from the transmitter 16 will not be reflected back to the receiver 18. This will cause the receiver 18 to initiate the sounding of an alarm, not shown, which signals the arrival of a person into the designated area who is not wearing the specified safety eyewear for that area.

Referring particularly to the electrical diagram of FIG. 3, the interaction of the various elements which make up the detection system 10 is described in conjunction with FIG. 3. The lamp 26 and the photo receptor 28 are located on lines 32 and 33 which are connected across a pair of power lines 27 and 29 from a source of electrical power 30. The transceiver 14 is located on a line 34 which contains a normally open contact 36 to maintain the transceiver 14 in a normally de-energized state. When a person enters the entryway 12, the beam of light from the lamp 26 is interrupted. This causes the normally open contact 36 of the receptor 28 to close, thereby completing a circuit across the power lines 27 and 29 through line 34 and energizing the transceiver 14. The transmitter portion 16 of the transceiver transmits a beam of infrared radiation toward the other side of the entryway 12. If the person in the entryway 12 is wearing the specified safety eyewear, a portion of the infrared beam will strike the reflector 22 and be reflected back to the receiver portion 18 of the transceiver. If the person is not wearing the specified safety eyewear, no infrared radiation will be reflected to the receiver 18. This causes its normally open contact 40 on line 42 to close, thereby connecting line 42 across the power line 27 and 29 and energizing an alarm 38 which is on line 42. This will either remind the individual who set off the alarm of the need to wear proper eyewear or alert supervisory personnel that a person who is wearing improper eyewear has entered the designated area.

Figure 4:
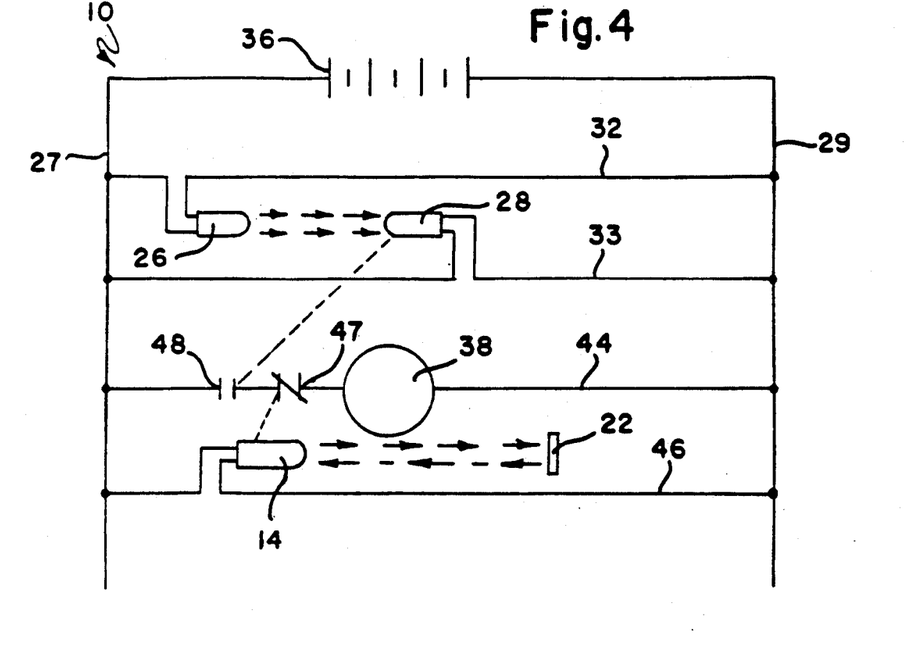
FIG. 4 is an electrical diagram showing a variation of electrical controls for the first embodiment of the present invention shown in FIG. 1.

Referring to FIG. 4, there is shown electrical diagram which illustrates a variation in the electrical controls and operation of the first embodiment of the present invention and is generally indicated by the reference numeral 10'. The lamp 26 and the photo receptor 28 are connected to lines 32 and 33 which are connected across the power lines 27 and 29 in the same manner as shown in FIG. 3. The transceiver 14 is located on a line 46 which is connected across the power lines 27 and 29 so that the transceiver 14 is normally in an energized state. Therefore, the beam of infrared radiation from the transmitter portion 16 of the transceiver is transmitted continuously across the entryway 12. The alarm 38 is located on a line 44 which contains a normally open contact 48 and a normally closed contact 47. The alarm 38 is, thereby, normally in a de-energized state. The contact 48 is part of the internal circuitry of receptor 28. When the beam of light from the lamp 26 is interrupted by a person walking through the doorway 12, the photo receptor 28 closes the contact 48. If the person who interrupted the beam of light from the lamp 26 is wearing specified safety eyewear, infrared radiation from the transmitter portion of the transceiver 14 will strike the reflector 22 on the eyewear and will be reflected back to the receiver portion 18 of the transceiver. The transceiver 14 has a built in relay circuit which includes the normally closed contact 47 and is effective to open the contact 47 when reflected infrared radiation is received by the receiver 18. This will keep the line 44 open and maintain the alarm 38 in the de-energized state. However, if the person is not wearing the proper protective eyewear, no reflected infrared radiation will be received by the transceiver 14 and the normally closed contact 47 will remain closed. Since the normally open contact 48 is also closed by the relay circuit of the photo receptor 28 the alarm 38 will be energized to warn the person who is passing through the entryway 12 and other supervisory personnel that a person is entering the designated area without wearing the specified safety eyewear for that area.

Figure 5:
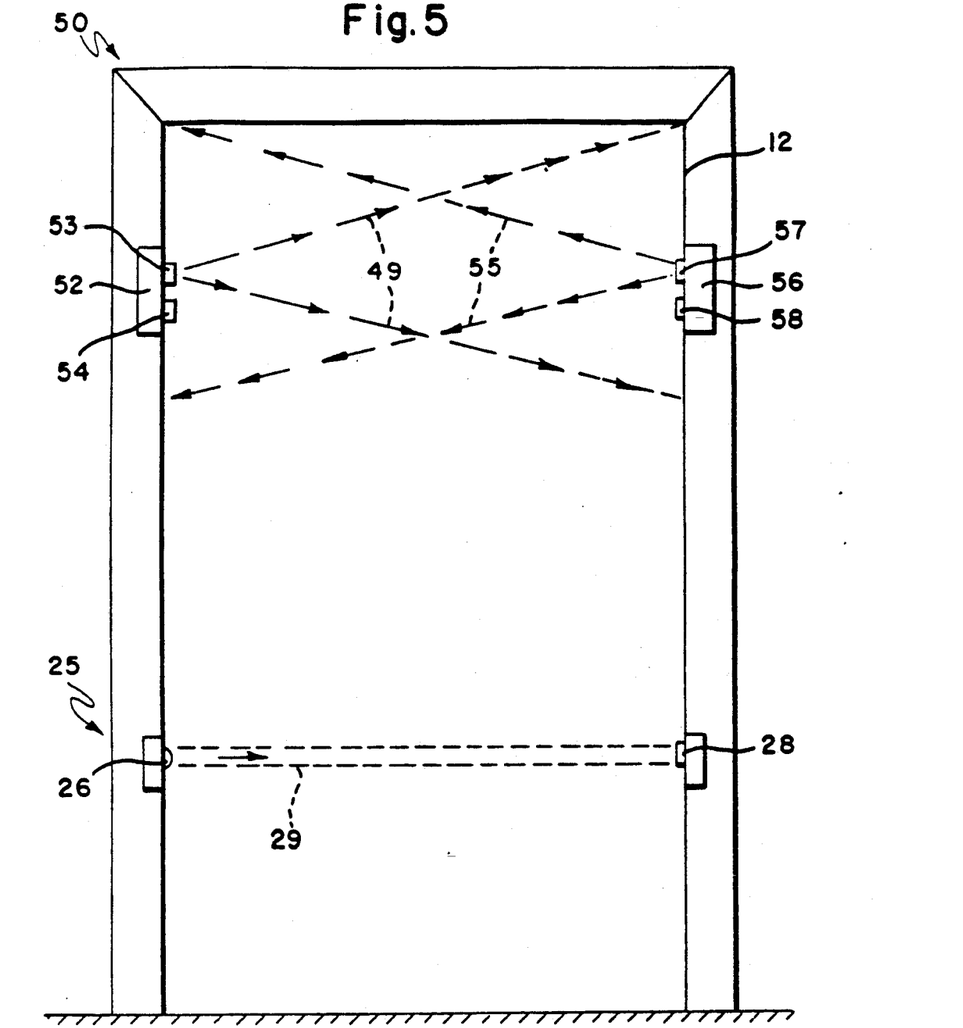
FIG. 5 is a front elevational view which is similar to FIG. 1 showing a second embodiment of the invention which was two transmitter receiver combinations.
Figure 6:
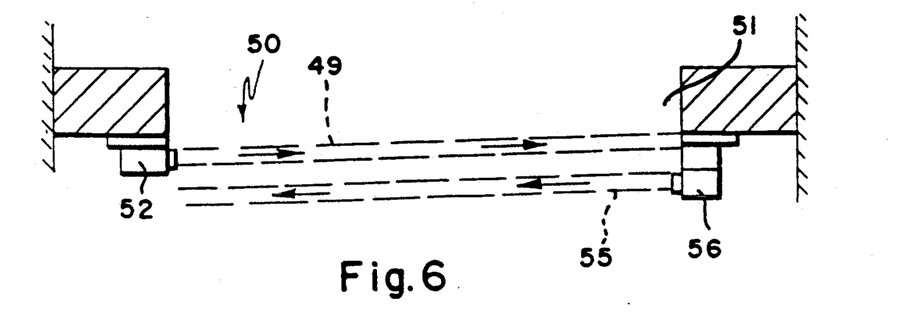
FIG. 6 is a plan view of the second embodiment, in which two transmitter receiver combinations are employed.

Referring to FIG.'s 5, 6 and 7, there is shown a second embodiment of the invention which is generally indicated by the reference numeral 50. The detection system 50 comprises the same electronic sensor 25 as for the first embodiment, including the lamp 26 for transmitting the beam of light 29 across the entryway 12 to the photo receptor 28. The detection system 50 also comprises a first transceiver 52 which is located at one side of the entryway 12 and a second transceiver 56 which is located at the opposite side of the entryway. The first transceiver 52 comprises a transmitter 53 for transmitting a beam, 49, of infrared radiation to the opposite side of the entryway and a receiver 54 for receiving reflected infrared radiation. The second transceiver 56 comprises a transmitter 57 for transmitting a beam, 55, of infrared radiation to the first side of the entryway and a receiver 57 for receiving reflected infrared radiation. Each infrared transmitter transmits a beam of infrared radiation which spreads vertically but is relatively narrow from front to back. The transceivers 52 and 56 are offset front to back as shown in FIG. 6 so that the beams from their respective transceivers are offset front to back. Therefore, the infrared radiation from one transmitter will not affect the receiver of the other transmitter. The safety eyewear which is to be used with the second embodiment 50, indicated by the reference numeral 64 in FIG. 8, is equipped two infrared reflectors 66 and 68 which are located on opposite sides of the eyeglass frame.

Figure 7:
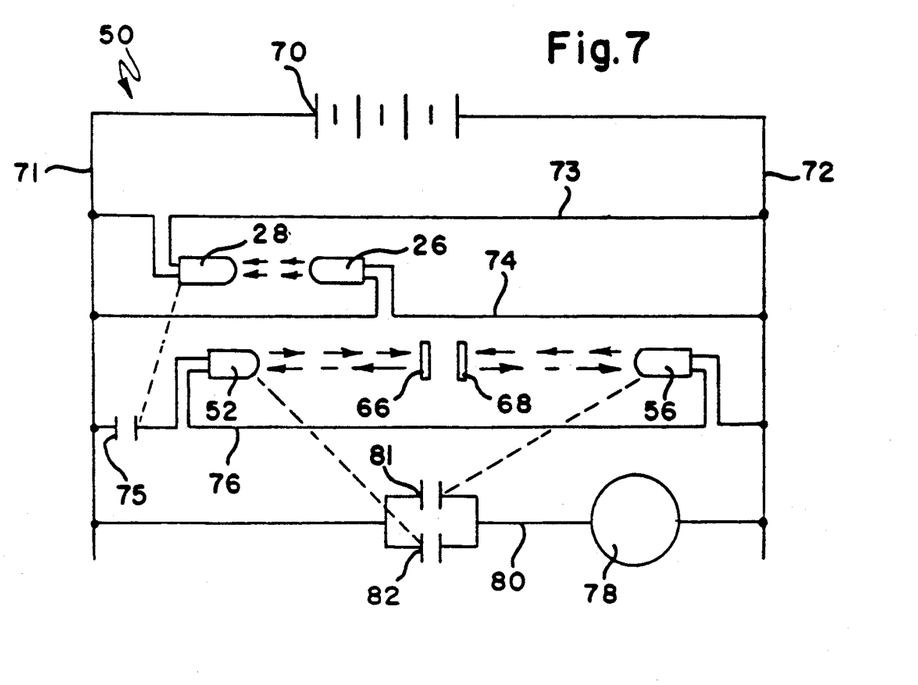
FIG. 7 is an electrical diagram of the electrical controls for the second embodiment of FIG. 5.
Figure 8:
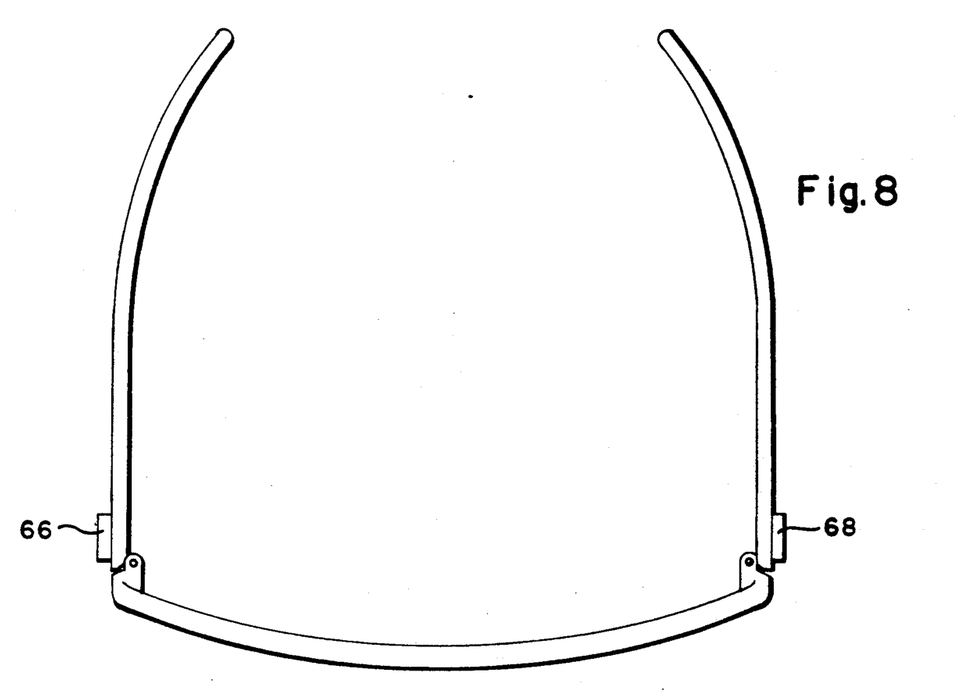
FIG. 8 is a plan view of safety equipment which is equipped with two infrared reflectors which form part of the second embodiment of FIGS. 5-7.

The operation of the second embodiment 50 will now be readily understood with reference to the electrical controls which are shown in FIG. 7. The lamp 26 and the photo receptor 28 are located on lines 74 and 73, respectively, which are connected across a pair of power lines 71 and 72 which are, in turn, connected to a source of electrical power 70. The lamp 26 is on constantly for transmitting a continuous beam of light 29 to the photo receptor 28. The first and second transceivers 52 and 56, respectively, are located on a line 76 which also contains a normally open contact 75. This maintains the line 76 open and the first and second transceivers 52 and 56, respectively, deactivated. An alarm 78 is located on a line 80 which contains a pair of parallel normally open contacts 81 and 82. The contacts 81 and 82 keep the line 80 open and maintain the alarm 78 in a deactivated state. The closing of either of the contacts 81 and 82 will complete a circuit across the line 80 between the power line 71 and 72 to activate the alarm 78. The contact 81 is part of a relay circuit of the second transceiver 56. The normally open contact 81 forms part of a relay circuit of the first transceiver 52. When a beam of light from the lamp 26 is interrupted by a person walking through the entryway 12, the photo receptor 28 is effective to close the normally open contact 75 which forms part of the relay circuit of the photo receptor 28. The closing of contact 75 completes a circuit across the line 76 and energizes the transceivers 52 and 56 for transmitting beams of infrared radiation in opposite directions, as shown in FIG.'s 5 and 6. If the person who is passing through the entryway 12 is wearing proper safety eyewear 64, infrared radiation will be reflected from the reflector 66 back to the receptor portion 54 of the first transceiver 52 and infrared radiation will be reflected from the reflector 68 back to the receiver portion 58 of the second transceiver 56. When this occurs, the contacts 81 and 82 will remain open. However, if the receiver portion of either of the transceivers 52 and 56 does not receive reflected infrared radiation it will close its respective contact 81 or 82. This will complete a circuit across line 80 and energize the alarm 78.

Figure 9:
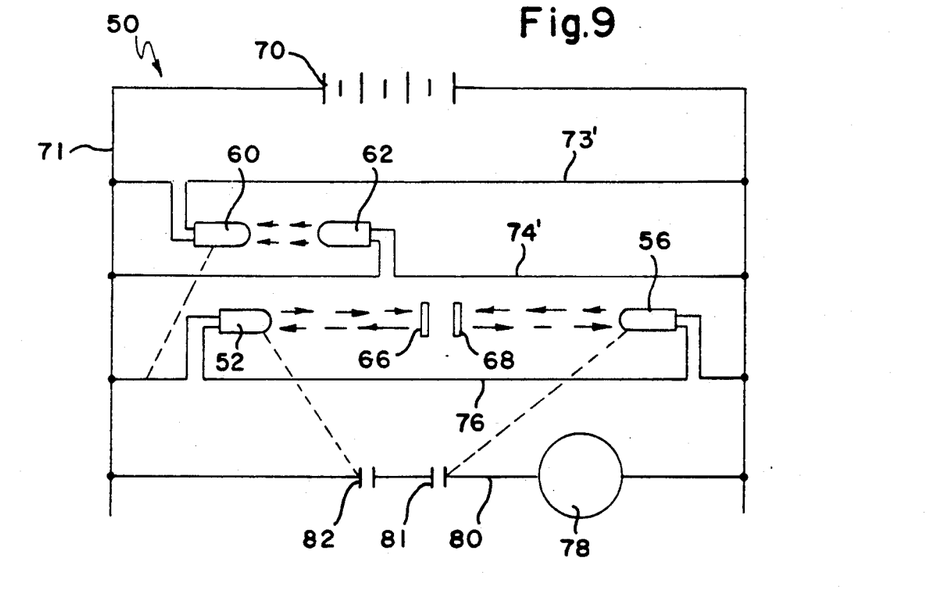
FIG. 9 is an electrical diagram showing a variation of the electrical controls for the second embodiment.

FIG. 9 shows a variation in the controls and operation of the second embodiment of the invention which is generally indicated by the reference numeral 50'. The controls for the variation 50' of the second embodiment are identical to the controls which are shown and described in FIG. 7, except that the normally open contacts 81 and 82 of the first and second transceivers 52 and 56 respectively are arranged in series on line 80 which contains the alarm 78. In this variation, if only one transceiver fails to receive reflected infrared radiation, its corresponding contact 81 or 82 on line 80 will be closed. However, the other contact on 80 which is controlled by the other transceiver will remain open as long as the other transceiver receives reflected infrared radiation from the corresponding reflector of the safety eyewear 64. If neither of the transceivers 52 and 56 receives reflected infrared radiation, both contacts 81 and 82 will be closed and the alarm 78 will be activated.

Figure 10:
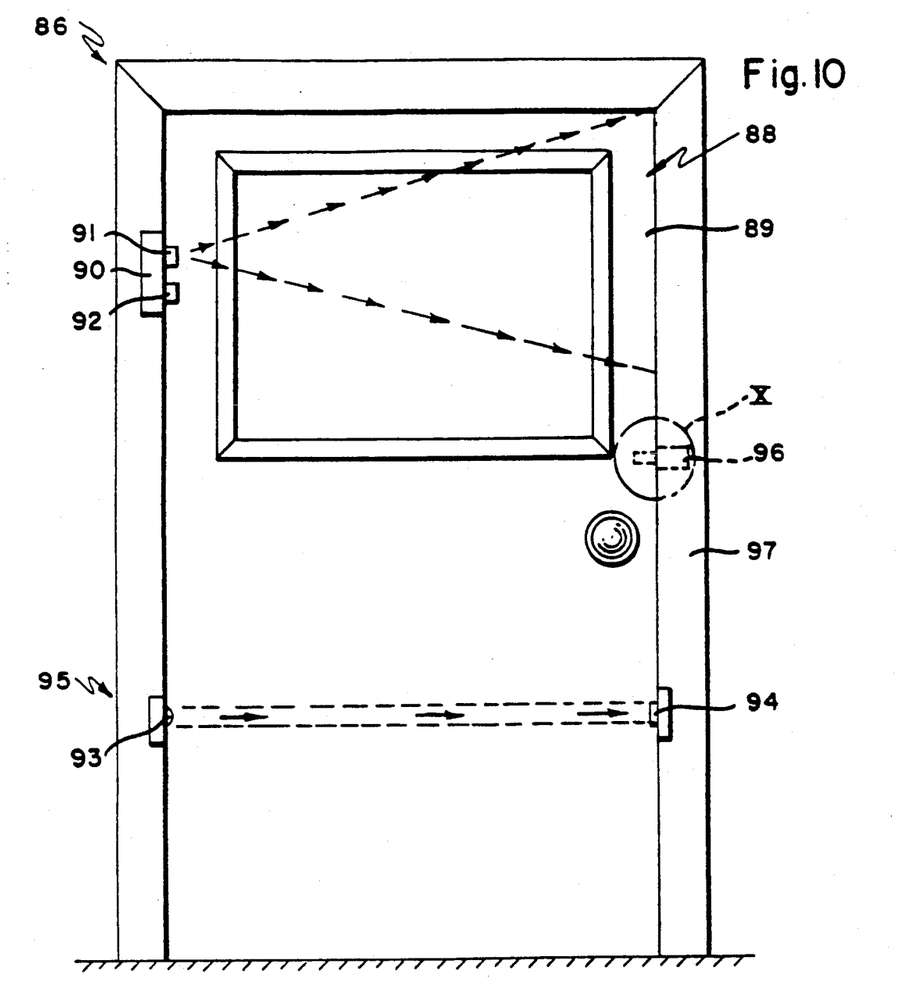
FIG. 10 is a front elevational view of an entryway which is equipped with a third embodiment of the present invention.
Figure 11:
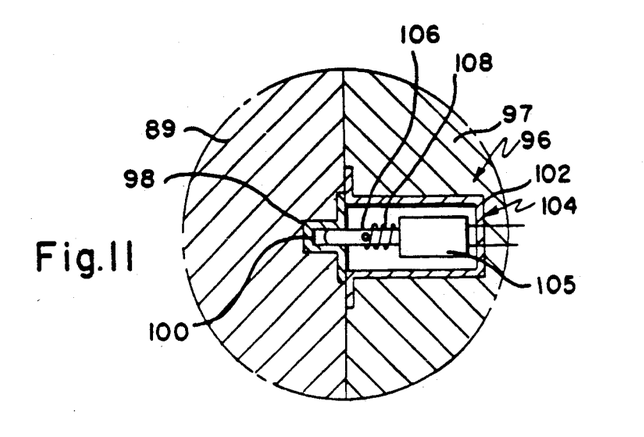
FIG. 11 is a fragmentary cross sectional view of an area of FIG. 10 which is indicated by the reference numeral X and shown on an enlarged scale.

Referring to FIG.'s 10 and 11 there is shown a third embodiment of the detection system of the present invention which is generally indicated by the reference numeral 86. The detection system 86 is shown applied to an entryway 88 which is closed by a door 89. The door 89 is maintained in a normally locked state by means of an electrically actuated locking mechanism 96. The detection system 86 comprises a transceiver 90 which is located at one side of the doorway and which includes an infrared transmitter 91 and an infrared receiver 92. When activated, the transmitter 91 projects a beam of infrared radiation across the entryway 88 to the opposite side of the entryway. The detection system 86 also comprises an electric sensor, generally indicated by the reference numeral 95, which includes a lamp 93 at one side of the entryway 88 and a photo receptor 94 at the opposite side of the entryway. The lamp 93 projects a light beam across the entryway to the photo receptor 94. The transceiver 90 and the sensor 95 are located sufficiently in front of the door 89 so that the light beam from the lamp 93 and the infrared radiation from the transmitter 91 will be interrupted by a person, as that person approaches the door 89. The door 89 is maintained in a normally locked state to prevent persons from entering the designated area beyond the door, unless the person is wearing specified safety eyewear. The locking mechanism 96 locks the door 89 against the adjacent door jam 97 and comprises a catch 98 which is recessed in the outer edge of the door and which has a bore 100 which faces the door jam 97. The lock 96 also includes a housing 102 which is recessed in the edge of the door jam and which faces the catch 98. The housing 102 contains a solenoid, generally indicated by the reference numeral 104, which includes a core 105 and a plunger 106 which is moveable relative to the core 105 toward and away from the bore 100 of the catch 98. When the solenoid 104 is in the de-energized state, a spring 108 maintains the plunger 106 within the bore 100 to maintain the door 89 in the locked condition. When the solenoid 104 is energized, the plunger 106 is drawn into the core out of the bore 100 so that the door 89 is in the unlocked condition.

Figure 12:
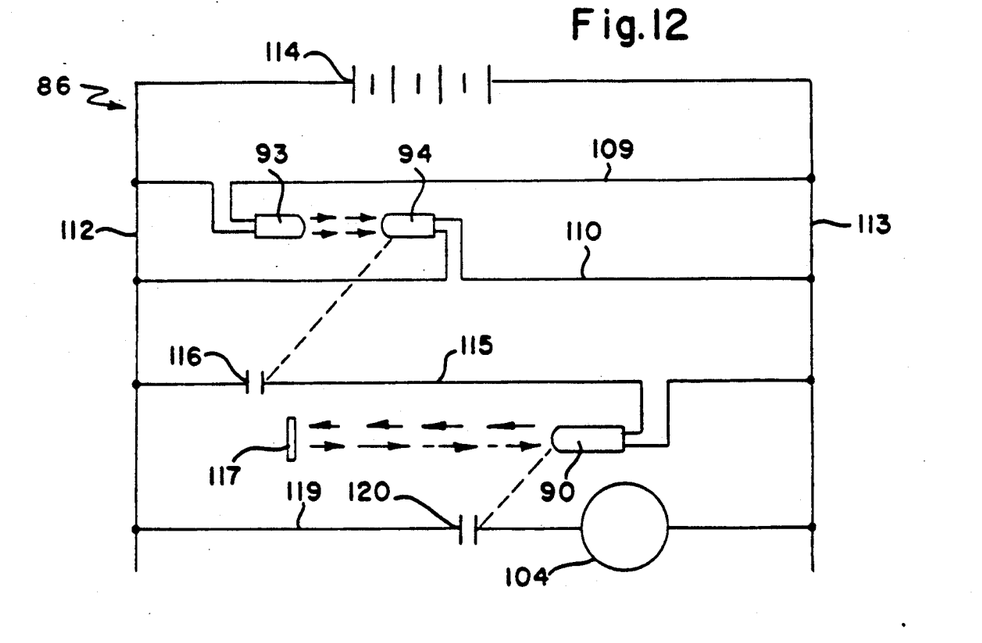
FIG. 12 is an electrical diagram of the electrical controls for the third embodiment of the invention.

The operation of the third embodiment 86 will be readily understood in conjunction with the electrical controls for the third embodiment shown in FIG. 12.

Referring to FIG. 12, the lamp 93 and the photo receptor 94 are located on lines 109 and 110 which extend across a pair of power lines 112 and 113 which are connected to a source of electrical power 114. The photo receptor 94 includes a relay circuit which includes a normally open contact 116 on line 115. The transceiver 90 is also located on line 115 and is maintained in a de-energized state due to the open contact 116. The transceiver 90 has a relay circuit which includes a normally open contact 120 on line 119. The solenoid 104 is also located on line 119 and is maintained in the deactivated state due to the open contact 120. When a person approaches the door 89 the light beam from the lamp 93 to the photo receptor 94 is interrupted. This causes the relay circuit of the photo receptor 94 to close the normally open contact 116. This completes a circuit across the line 115 and energizes the transceiver 90. The transmitter 91 of the receiver 90 projects a beam of infrared radiation across the doorway 88. If the person who is approaching the door 89 is wearing specified safety eyewear, it has attached thereto an infrared reflector 117. The infrared radiation from the transmitter 91 strikes the infrared reflector and a portion of the beam is reflected back to the receiver 92. When the reflected infrared radiation is received by the receiver 90, its relay circuit is activated to close the normally open contact 120 to complete a circuit across the line 119 and thereby energize the solenoid 104. When the solenoid 104 is energized, the plunger 106 is drawn out of the bore 100, thereby unlocking the door 89. This allows the person to open the door and pass through the entryway 88 into the designated area behind the door 89.

Figure 13:
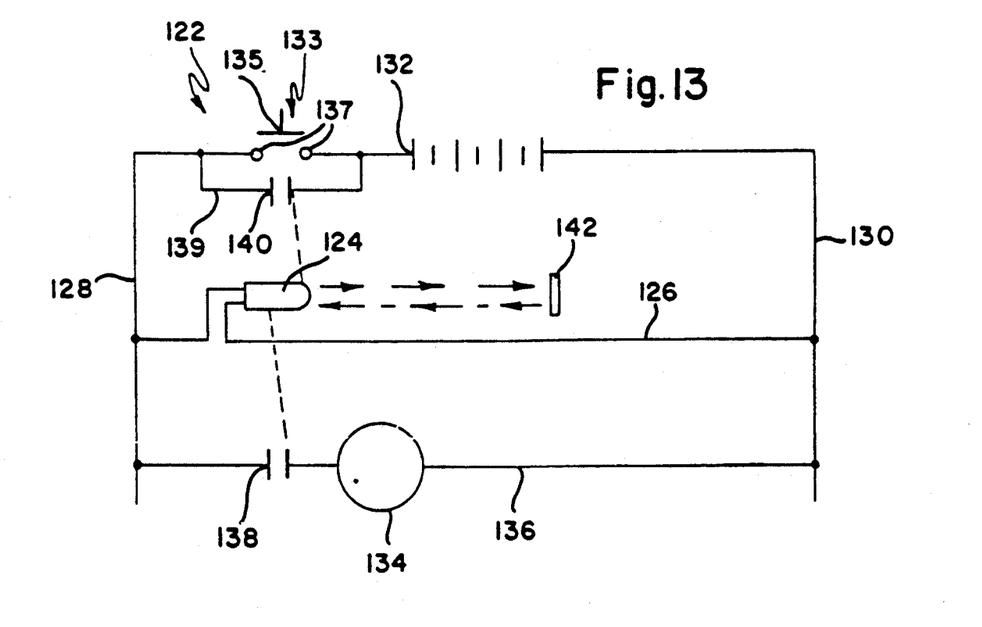
FIG. 13 is an electrical diagram of the electrical controls for a fourth embodiment of the invention.

Referring to FIG. 13 there is shown a fourth embodiment of the detection system of the present invention which is generally indicated by the reference numeral 122. The detection system 122 comprises a transceiver 124 which is identical to any of the transceivers in the previous embodiments and includes an infrared transmitter and an infrared receiver. The transceiver 124 is located on a line 126 which is connected across a pair of power lines 128 and 130 which are connected to a source of electrical power 132 through an electrical starting circuit, generally indicated by the reference numeral 133. The starting circuit 133 includes a spring return normally open push button switch 135 which, when depressed, bridges a pair of contacts 137 to connect the power line 128 to the source of electrical power 132. A line 139 bridges the contacts 137 and contains a normally open contact 140 which keeps the line 139 open. The contact 140 is part of a relay circuit of the transceiver 124 which also includes a normally open contact 138 on line 136. A drive motor 134 for the machine is also located on line 136 and is maintained in a normally de-energized state by means of the open contact 138. The transceiver 124 is positioned in relation to the machine so that it is located on one side of a position which is occupied by the operator of the machine when he or she is operating the machine. Therefore, the transmitter portion of the transceiver projects a beam of infrared radiation towards to the opposite side of the location which is normally occupied by the operator. The machine is started by pressing the push button 134 to bridge the contacts 137 and to complete a circuit across the line 126, thereby energizing the transceiver 124. Energization of the transceiver 124 will cause its transmitter to project a beam of infrared radiation toward the operator of the machine. If the operator is wearing safety eyewear which is specified for that machine, it will have an infrared reflector 142 which reflects the infrared radiation back to the receiver portion of the transceiver 124. This causes the normally open contacts 140 and 138 to close. Closing of the contact 138 completes a circuit across the line 136 to energize the drive motor 134 of the machine. Closing of the contact 140 closes the line 139 to effectively bridge the contacts 137 so that everything beyond the starting circuit 133 is maintained energized when the push button 135 is released. If the operator of the machine is not wearing safety eyewear which is specified for that machine, no reflected infrared radiation will be received by the transceiver 124. Therefore, the contacts 138 and 140 remain open and the machine can not be started. If the operator removes the safety eyewear or walks away from the machine, reflected infrared radiation will not be received by the transceiver 124, thereby causing contacts 138 and 140 to open and causing the machine to stop. Since the contact 140 also opens, the circuit through the line 128 will be broken and the transceiver will be de-energized. The machine can only be restarted by the pushing of the start button 135 by a person who is wearing safety eyewear which is specified for the machine.

The above examples have been directed to a detection system for safety eyewear, however, it is well appreciated by those skilled in the art that other types of safety equipment are also within the spirit and scope of the invention. For instance, faceshields, dust masks, respirators, safety goggles, hearing protectors and other safety equipment are often required to avoid occupational hazards, and as such, the detection system of the present invention is also beneficial.

Likewise, the detection system described above is not limited to the infrared technology, but may also incorporate a number of alternative commercially available technologies. For example, U.S. Pat. No. 4,673,923, Boscoe et al., discloses a resonant circuit bearing tag which is useful for protecting articles against unauthorized removal. The construction of the tag may be in any form conventional in the field of article protection by means of resonant circuit-bearing tags. In particular, the tag will be a multi-layer structure that consists of a dielectric substrate on which is formed the resonant circuit. The circuit, in turn, consists of of patterns of metal positioned on opposite sides of the substrate. These patterns form an inductor and a capacitor, with the substrate providing their mechanical support and also the dielectric for the capacitor plates located on opposite sides of the substrate. Like Boscoe, et al., a similar resonant circuit may be implemented, e.g. attached or molded, on the designated safety equipment. In this scenario, an alarm, buzzer or warning light would be activated if a person attempted to enter into a designated area or operate a piece of machinery without wearing the specified safety equipment. The disclosure of the entire Boscoe patent is incorporated herein by reference. Further details concerning similar resonance circuits may be had by reference to U.S. Pat. No.'s 4,692,747, 4,728,938, 4,835,524, to Wolf, Kaltner, Lamond et al., respectively.

Similarly, U.S. Pat. No. 4,914,700, to Alasia, discloses a method and apparatus for scrambling and unscrambling bar code symbols. The use of bar code technology is well known in many areas, especially in grocery store check out lines. A bar code symbol, which is typically defined as a graphically reproduced array of elements formed of various widths, parallel, rectangular bars and spaces therebetween, may be attached to the designated safety equipment. The bar code is read by optically scanning a light beam, either utilizing infrared or visible light, transversely across all the elements of the bar code symbol. The electrical signals emitted by the bars and spaces in each character can then be decoded by an electronic computer or a decoder to recover the desired information. In the detection system of the present invention, an alarm would sound if a person attempted to enter into a designated area or operate a piece of machinery without wearing the proper safety equipment, as identified by the specified bar code symbol. The disclosure of the entire Alasia patent is also incorporated herein by reference.

Figure 14:
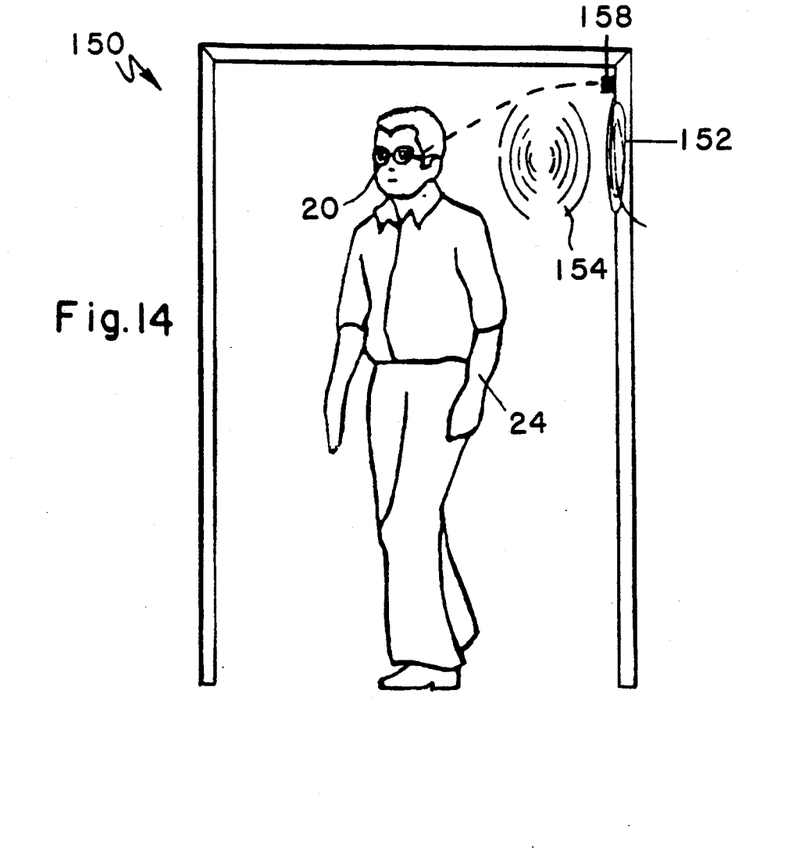
FIG. 14 is a front elevational view showing a person in an entryway which is equipped with the detection system of the present invention in a fifth embodiment.
Figure 15:
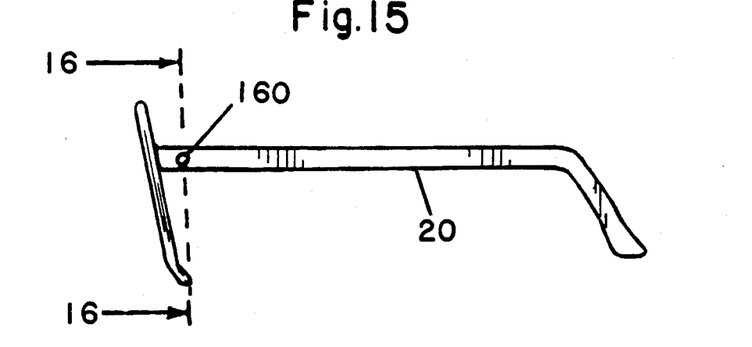
FIG. 15 is a side view of an example of safety equipment which forms a part of the detection system of the present invention in the fifth embodiment.
Figure 16:
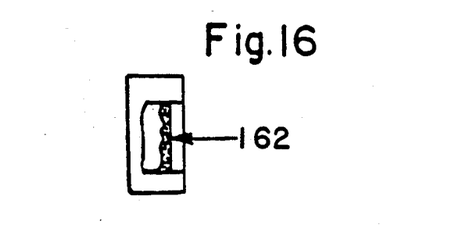
FIG. 16 is a cross-section on line 16—16 of FIG. 15.

A preferred fifth embodiment of the detection system of the present invention, as illustrated in FIG.'s 14–16, is generally indicated by reference numeral 150. The detection system 150 comprises a teleloop 152 mounted onto one side of the entryway 12, a signal generating means (not shown), a ferromagnetic transducer 160, a sound receiving means 158, and an alarm (not shown).

The teleloop 152 emits an inductive or telemagnetic field 154 toward the opposite side of the entryway 12 and in the direction of an individual 24 who is passing through the entryway 12. By teleloop is meant any coil, cable, or wire housing that contains a number of winding turns, typically in a spiral-like arrangement. The teleloop will generally consist of a coiled copper insulated wire or plastic insulated copper lead, however other conductive materials, such as carbon black, graphite, silver, aluminum, gold, etc. may also be employed. Similar "teleloop systems" are often employed in personal paging systems, hearing enhancement systems and the like. The number of turns in the teleloop 152 is directly proportional to the desired strength of the telemagnetic field. Therefore, as the number of turns increases in the teleloop 152, the field strength of the telemagnetic field 154 will also increase. The telemagnetic field 154 must be sufficient to cover the effective passage area of the entryway 12, i.e. the region of the entryway where a particular item of safety equipment should be worn by an individual. For example, an additional teleloop to the one shown in FIG. 14 may be placed at the bottom of the entryway 12 in environments where protective footwear is mandatory. In an alternative position to that shown in FIG. 14, the teleloop 152 may be located on the top of the entryway 12 and thus emit a field down toward a passing individual 24.

The signal generating means (not shown in FIG. 14) supplies a signal to the teleloop 152 at a pre-selected frequency. Preferably, the signal provided to the teleloop 152 will have a frequency in the audible or ultrasonic area to reduce the mechanical dimensions of the transducer 160, and as such will range from about 15 kHz to about 2 MHz. Typically, an electrical A/C current signal at a pre-selected frequency is supplied by the signal generating means, e.g. an oscillator, to the teleloop, thereby creating a magnetic field 154, usually defined as a flux. The telemagnetic field, in turn, will be at the same pre-selected frequency as the signal originally supplied to the teleloop 152. In other words, once the teleloop is exposed to an electrical current, a telemagnetic field 154 of the same pre-selected frequency will be generated outward from the direction of the teleloop 152. In addition, the strength of the field at any particular point in the field will be dependent on the distance from the teleloop itself and the strength of the current supplied by the oscillator or similar type of signal generating means. In general, the signal generating means can be implemented into one side of the entryway 12, housed together with a microphone unit or the like, or adapted for attachment to an external remote source.

The ferromagnetic transducer 160, as particularly illustrated in FIG. 15 is located on the specified safety equipment, and again for illustrative purposes, on the protective eyewear 20. The transducer 160 comprises a small membrane or "tongue" of ferromagnetic material 162 that will become activated upon passage into the inductive field 156 and, as a result, will vibrate at the same pre-selected frequency as the inductive field 156 to generate a tone (not shown). As a general guideline, the membrane will have a thickness between about 0.01 mm and about 0.02 mm, keeping in mind that the mechanical dimensions of the membrane 162 will decrease as the frequency of the magnetic field 154 increases. This inter-relationship becomes important when fabricating the ferromagnetic transducer and determining the pre-selected frequency of the tone. Typically, a thin ferromagnetic metal blade or a plastic foil membrane containing ferromagnetic particles (e.g. video tape film, tape recorder film) is suitable. Preferred ferromagnetic materials include soft iron powders mixed with plastic, ferric oxides, chromium oxides and the like. Mixtures of plastic and ferromagnetic materials are especially preferred because of the increased flexibility experienced by the membrane 162, thereby allowing the ferromagnetic particles to experience an increase in vibration.

The ferromagnetic transducer 160 can be molded directly into the safety equipment or may be attached using conventional methods.

The sound receiving means 158 receives the tone generated from the vibration of the membrane 162. Any conventional sound receiving means may be employed, such as a microphone unit or radio receiver. Such receivers are well known to those skilled in the art and are commercially available from a number of sources. Finally, as provided in the previous embodiments, an alarm, which is normally inactive, is operatively connected to the signal generating means and sound receiving means. The alarm remains inactive when the transducer produced tone is received by the sound receiving means and becomes activated when no transducer produced tone is received by the sound receiving means. And lastly, an electronic sensor as previous described or other motion detectors commercially available may also be employed to sense an individual's presence in the entryway and activate the signal generating means.

Still another embodiment of the detection system of the present invention comprises a transducer which is located on one side of an entryway for emitting a radiation wave toward the opposite side of the entryway, the wave emitted at a pre-selected frequency, and a resonator which is located on the specified safety equipment. The resonator, in turn, comprises a ceramic crystal that is tuned to resonate at the same pre-selected frequency as the radiation wave to generate a tone. The word ceramic crystal is taken to mean known crystals typically used in resonators, as well as those ceramic materials that are known to mechanically act as crystals like quartz.

A sound receiving means is used to receive the tone generated from the resonating crystal and is operatively connected to the transducer and an alarm or warning system. As previously described, the alarm is normally inactive and will remain inactive when the resonating produced tone is received by the sound receiving means. On the other hand, the alarm will be activated if no resonating produced tone is received by the sound receiving means. In other words, should a person pass through a designated area or operate a piece of machinery without the proper safety equipment, an alarm or the like would sound, thereby alerting any manager or supervisor of the noncompliance with the established safety procedures. The underlying concept illustrating this embodiment of the present invention may be best understood by the following example in the audible frequency area: when a musical instrument is played near a glass, the instrument can actually strike the actual tone which will make the glass resonate. It is also well known that this resonance will be audible even after the tone has ended. Consequently, it is possible to emit a sound, in this case a cord on the instrument, and detects "anything that is resonating at a specific frequency" by simply switching a transducer or similar sound receiver, for example, a loudspeaker unit or microphone, into the "listening mode." The above-described principle is also applicable in the non-audible frequency area, i.e. above 16–18 kHz, and as a result, may also be utilized in the detection system of the present invention. Preferably, the transducer emits an ultrasonic radiation wave having a frequency between about 40 kHz and 2 MHz, however, other radiation waves on the electromagnetic spectrum can also be utilized. The dimensions of the resonator itself will be indirectly proportional to the pre-selected frequency. In other words, the mechanical dimensions of the resonant material will decrease as the pre-selected frequency increases. This allows for flexibility when building the detection system and choosing the materials of construction for both the transducer and the resonator. A wide range of ceramic crystals can be "tuned" to resonate at a specific frequency if exposed to a similarly specific tone. Preferably the ceramic crystal is selected from the group consisting of barium titanate, quartz, etc. and other crystals typically employed in, for example, the radio industry.

Another embodiment that may be utilized with the detection system of the present invention is based on the reflection principle of light. In this embodiment, a white light source is located on one side of an entryway. A broad spectrum of light is emitted toward the opposite side of the entryway to illuminate one side of a person who is passing the entryway. By means of a simple detection of a reflected color spectrum it will be possible, either by means of a prism or a color filter and for example, a CCD (cascade coupled device) optical sensor, to detect precisely the color of specified equipment which have been "approved" for the particular area in question. The CCD unit is well known from the video camera technology where it is CCD element is used to convert a picture into an electrical signal.

More specifically, a color CCD based video camera may be mounted in or near an entryway or specific passage area. First, the CCD element in the camera may be used to detect, without the aid of a separate motion detection system, the presence of an individual within a designated area. A color filter, for example an infrared filter, is placed on the front of the CCD camera. In addition, a reference color plate is located in a direction opposite from the camera but within the scope of the camera's view. The specified safety equipment will also contain a pre-selected color reference, the color reference being typically incorporated into the fabrication process. For example, a pair of protective eyeglasses may be made by an injection molded process whereby the pre-selected color reference is incorporated into the color of the eyeglass frame. In any particular detection system, the pre-selected color reference used on the designated safety equipment will be identical to the reference color plate. Typically, the colors will be matched as a function of temperature and wavelength, thereby allowing a particular color to be specifically adapted to certain equipment or even to a particular company. The CCD camera will then simultaneously view and compare the reference color plate and the article of safety equipment with the pre-selected color reference. If the match is not identical, an alarm would sound warning that the individual has entered the area without the proper safety equipment. Therefore, the use of a logical AND or OR gate system will allow the CCD camera to be used to detect the presence of a person in a designated area, as well as determining whether that person is wearing the designated safety equipment. Furthermore, it is possible to utilize a low cost standard camera and a monitor with a color and shape reference in conjunction with the detection system of the present invention to provide a general surveillance system. Another embodiment that may be utilized with the detection system of the present invention involves a whistle principle similar to that employed in dog whistles. In this embodiment, the frame of a pair of safety eyeglasses, for example, may be so shaped that when passing an air-flow blown from the side, a whistling signal would be emitted. Typically, the frame would comprise a small hole of sufficient size to emit the whistle. The frequency of the whistle is then tuned to produce a "tone" which received by a microphone or similar sound receiving means set to the same frequency. As in the ultrasonic embodiment described above, an alarm would sound if no "tone" was received by the microphone, thus indicating that the person was not wearing the proper safety equipment.

Clearly, minor changes may be made in the form and construction of the invention without departing from the material spirit thereof. It is not, however, desired to confine the invention to the exact form herein shown and described, but it is desired to include all such properly come within the scope claimed.

The invention having been thus described, what is claimed as new and desired to secure by Letters Patent is:

1. A detection system for monitoring specified safety equipment being worn by persons who are passing through an entryway into a designated area which requires that persons in said area be wearing said specified safety equipment, said detection apparatus comprising:
   (a) an infrared reflector which reflects infrared radiation and which is fixed to said specified equipment,
   (b) an infrared transmitter which is located at one side of said entryway for transmitting a beam of infrared radiation toward the opposite side of said entryway so that at least a portion of said beam is reflected back to said one side by the reflector of said specified equipment which is worn by a person who is passing through said entryway,
   (c) a receiver which is located at said one side of said entryway for receiving said reflected infrared radiation, and
   (d) an alarm which is normally inactive and which is operatively connected to said transmitter and said receiver, said alarm remaining inactive when a beam of infrared radiation is transmitted by said transmitter and reflected to said receiver, said alarm being activated when a beam of infrared radiation is transmitted by said transmitter and no reflected infrared radiation is received by said receiver.

2. The detection system according to claim 1, wherein said transmitter and said receiver are housed in a single transceiver unit.

3. The detection system according to claim 1, wherein said transmitter is normally inactive and activated to transmit a beam of infrared radiation upon receiving a predetermined electrical signal and wherein said detection system further comprises an electronic sensor which is operatively connected to said transmitter and which is located at said entryway for sensing a person who is passing through said entryway and for transmitting said predetermined electrical signal to said transmitter when a person passes through said entryway.

4. The detection system according to claim 3, wherein said electronic sensor comprises:
   (a) a lamp which is located at one side of said entryway for projecting a beam of light toward the opposite side of said entryway, and
   (b) a photo receptor which is located on the side of said entryway opposite from said lamp for receiving said beam of light, said receptor being operatively connected to said transmitter for transmitting said predetermined electrical signal to said transmitter upon the interruption of said beam of light by a person who is passing through said entryway.

5. The detection system according to claim 1, wherein said transmitter is a first transmitter and said receiver is a first receiver, wherein a second infrared transmitter is located at the opposite side of said entryway for transmitting infrared radiation toward said first side and a second infrared receiver is located at said opposite side for receiving reflected infrared radiation from said first side, wherein there are two infrared reflectors, a first infrared reflector which is fixed to one side of said designated equipment for reflecting infrared radiation from said first transmitter to said first receiver and a second reflector for reflecting infrared radiation from said second transmitter to said second receiver and, wherein said alarm is operatively connected to said first and second transmitters and said first and second receivers, said alarm remaining inactive when infrared radiation is transmitted by said first and second transmitters and reflected from first and second reflectors, respectively, to said first and second receivers, respectively, said alarm being activated when infrared radiation is transmitted by said first and second transmitters and no reflected infrared radiation is received by at least one of said receivers.

6. The detection system according to claim 1, wherein said transmitter is a first transmitter and said receiver is a first receiver, wherein a second infrared transmitter is located at the opposite side of said entryway for transmitting infrared radiation toward said first side and a second infrared receiver is located at said opposite side for receiving reflected infrared radiation from said first side, wherein there are two infrared reflectors, a first infrared reflector which is fixed to one side of said designated equipment for reflecting infrared radiation from said first transmitter to said first receiver and a second reflector for reflecting infrared radiation from said second transmitter to said second receiver, and wherein said alarm is operatively connected to said first and second transmitters and said first and second receivers, said alarm remaining inactive when infrared radiation is transmitted by said first and second transmitters and reflected from at least one of said first and second reflectors, respectively, to at least one of said first and second receivers, respectively, said alarm being activated when infrared radiation is transmitted by said first and second transmitters and no reflected infrared radiation is received by either of said receivers.

7. The detection system according to claim 1 wherein said safety equipment is selected from the group consisting of protective eyewear, goggles, faceshields, respirators, dust masks, hardhats, hearing protectors, protective footwear, clothing, and combinations thereof.

8. A detection system for monitoring specified safety equipment being worn by persons who are approaching an entryway to a designated area which is closed by a door which has an electrically controlled lock, said lock being normally locked and being unlocked upon receiving a predetermined electrical signal, said detection system comprising:
  (a) a infrared reflector which reflects infrared radiation and which is fixed to said specified equipment,
  (b) a transmitter which is located at one side of said entryway in front of said door for transmitting a beam of infrared radiation toward the opposite side of said entryway so that at least a portion of said beam is reflected back toward said one side by the reflector of said specified equipment which is worn by a person who is approaching said door, and
  (c) a receiver which is operatively connected to said electrically controlled lock and which is located at said one side of said entryway in front of said door for receiving said reflected infrared radiation and for transmitting said predetermined electrical signal to said lock for unlocking said lock when infrared radiation is transmitted by said transmitter and reflected infrared radiation is received by said receiver.

9. The detection system according to claim 8, wherein said transmitter and said receiver are housed in a single transceiver unit.

10. The detection system according to claim 9, further comprising an electronic sensor which is operatively connected to said transmitter and which is located in front of said door for sensing a person who is approaching said door, said transmitter being normally inactive and activated to transmit a beam of infrared radiation when said electronic sensor senses a person who is approaching said door.

11. The detection system according to claim 10, wherein said electronic sensor comprises:
  (a) a lamp which is located at one side of said entryway for projecting a beam of light toward the opposite side of said entryway, and
  (b) a photo receptor which is located on the side of said entryway opposite from said lamp for receiving said beam of light, said photo receptor being operatively connected to said transmitter for activating said transmitter when said beam of light is interrupted by a person who is approaching said door.

12. The detection system according to claim 8 wherein said safety equipment is selected from the group consisting of protective eyewear, goggles, faceshields, respirators, dust masks, hardhats, hearing protectors, protective footwear, clothing, and combinations thereof.

13. A detection system for monitoring specified safety equipment being worn by persons who are passing through an entryway into a designated area which requires that such persons in said area be wearing specified safety equipment, said detection system comprising:
  (a) a reflector which reflects infrared radiation only and which is fixed to said specified equipment,
  (b) a transmitter which is located at one side of said entryway for transmitting a beam of infrared radiation toward the opposite side of said entryway so that at least a portion of said beam is reflected back to said one side by the reflector of said specified equipment which is worn by a person who is passing through said entryway,
  (c) a receiver which is located at said one side of said entryway for receiving said reflected infrared radiation,
  (d) an electronic sensor which is located at said entryway for sensing a person who is passing through said entryway, and
  (e) an alarm which is operatively connected to said receiver and said electronic sensor which is normally inactive and activated only when said electronic sensor senses a person passing through said entryway and no reflected infrared radiation is received by said receiver.

14. The detection system according to claim 13 wherein said safety equipment is selected from the group consisting of protective eyewear, goggles, faceshields, respirators, dust masks, hardhats, hearing protectors, protective footwear, clothing, and combinations thereof.

15. A detection system for monitoring specified safety equipment being worn by a person who is located at a designated position for operating an electrically driven machine which requires the wearing of said specified equipment by a person who is operating said machine, said detection system comprising:
  (a) an infrared reflector which reflects infrared radiation and which is fixed to said specified equipment,
  (b) an infrared transmitter which is located at one side of said designated position for transmitting a beam of infrared radiation across said designated position to a side of said designated position which is opposite said one side so that at least a portion of said beam is reflected back to said one side by the infrared reflector of said specified equipment by a person who is located at said designated position,
  (c) a receiver which is located at said one side of said designated position for receiving said reflected infrared radiation, and
  (d) control circuitry for said machine which is operatively connected to said transmitter and said receiver, said control circuitry being effective to maintain said machine normally inoperative and to enable said machine to operate only when radiation is transmitted by said transmitter and reflected from said reflector to said receiver.

16. The detection system according to claim 15, wherein said machine has a normally open starting switch which is operatively connected to said control circuitry and wherein said transmitter is normally de-energized and is energized when said starting switch is closed, said transmitter being maintained energized and said machine being maintained operative as long as reflective infrared radiation from said reflector is received by said receiver, said transmitter being de-energized and said machine being rendered inoperative when no reflective infrared radiation is received by said receiver.

17. The detection system according to claim 15, wherein said transmitter and said receiver are housed in a single transceiver unit.

18. The detection system according to claim 15 wherein said safety equipment is selected from the group consisting of protective eyewear, goggles, face-shields, respirators, dust masks, hardhats, hearing protectors, protective footwear, clothing, and combinations thereof.

19. A detection system for monitoring safety equipment being worn by persons who are passing through an entryway into a designated area which requires said persons in said area be wearing said safety equipment, said detection system comprising:
(a) a teleloop mounted onto said entryway, said teleloop emitting a telemagnetic field when exposed to a signal at a pre-selected frequency in a direction outward and opposite from said teleloop, said teleloop converting said signal into said telemagnetic field at said same pre-selected frequency, said field being sufficient to cover the effective passage area of said entryway;
(b) a signal generating means which supplies said signal to said teleloop at said pre-selected frequency;
(c) a ferromagnetic transducer which is located on said safety equipment, said transducer comprising a membrane which will become activated upon passage into said telemagnetic field emitted by said teleloop and will vibrate at said same pre-selected frequency as said telemagnetic field to generate a tone;
(d) a sound receiving means which will receive said tone generated from said vibration of said transducer membrane; and
(e) an alarm which is normally inactive and which is operatively connected to said signal generating means, said alarm remaining inactive when said transducer produced tone is received by said sound receiving means, said alarm being activated when no transducer produced tone is received by said sound receiving means.

20. The detection system according to claim 19 wherein said safety equipment is selected from the group consisting of protective eyewear, goggles, face-shields, respirators, dust masks, hardhats, hearing protectors, protective footwear, clothing, and combinations thereof.

21. The detection system according to claim 19 wherein said teleloop comprises a coiled copper insulated wire.

22. The detection system according to claim 19 wherein said signal is an electrical A/C current having said same pre-selected frequency.

23. The detection system according to claim 19 wherein said signal generating means supplies said signal in the form of an ultrasonic wave.

24. The detection system according to claim 19 wherein said sound receiving means is constructed to receive said tone in the form of an ultrasonic wave.

25. The detection system according to claim 24 wherein said ultrasonic wave has frequency is between about 16 kHz and 2 MHz.

26. The detection system according to claim 19 wherein said signal generating means supplies said signal in the form of an audible wave.

27. The detection system according to claim 19 wherein said sound receiving means is constructed to receive said tone in the form of an audible wave.

28. The detection system according to claim 27 wherein said audible wave has a frequency between about 16 kHz and 18 kHz.

29. The detection system according to claim 19 wherein said signal generating means supplies said signal in the form of an electromagnetic wave.

30. The detection system according to claim 19 wherein said transducer membrane is a ferromagnetic material.

31. The detection system according to claim 30 wherein said ferromagnetic material is a mixture of a ferric oxide and a plastic film.

32. The detection system according to claim 19, wherein said signal generating means is normally inactive and is activated to supply a signal to said teleloop upon receiving a predetermined electrical signal, wherein said detection system further comprises an electrical sensor which is operatively connected to said signal generating means and said sound receiving means and which is located at said entryway for sensing a person who is passing through said entryway, said electrical sensor transmitting said predetermined signal to said teleloop when said person passes through said entryway.

33. A detection system for monitoring specified safety equipment being worn by a person who is located at a designated position for operating an electrically driven machine which requires the wearing of said specified equipment by a person who is operating said machine, said detection system comprising:
(a) a teleloop mounted onto said designated position, said teleloop emitting a telemagnetic field when exposed to a signal at a pre-selected frequency in a direction outward and opposite from said teleloop, said teleloop converting said signal into said telemagnetic field at said same pre-selected frequency, said field being sufficient to cover the effective passage area of said designated position;
(b) a signal generating means which supplies said signal to said teleloop at said pre-selected frequency;
(c) a ferromagnetic transducer which is located on said safety equipment, said transducer comprising a membrane which will become activated upon passage into said telemagnetic field emitted by said teleloop and will vibrate at said same pre-selected frequency as said telemagnetic field to generate a tone;
(d) a sound receiving means which will receive said tone generated from said vibration of said transducer membrane; and
(e) control circuitry for said machine which is operatively connected to said signal generating means and sound receiving means, said control circuitry being effective to maintain said machine normally inoperative and to enable said machine to operate only when said transducer produced tone is received by said sound receiving means.

34. The detection system according to claim 33 wherein said machine has a normally open starting switch which is operatively connected to said control circuitry and wherein said signal generating means is normally de-energized and is energized when said starting switch is closed, said signal generating means being maintained energized and said machine being maintained operative as long as said transducer produced tone is received by said sound receiving means, said signal generating means being de-energized and said machine being rendered inoperative when no transducer produced tone is received by said sound receiving means.

35. A detection system for monitoring safety equipment being worn by persons who are passing through an entryway into a designated area which requires that persons in said area be wearing said safety equipment, said detection system comprising:
(a) a transducer which is located on one side of said entryway for emitting a radiation wave toward the opposite side of said entryway, said beam emitted at a pre-selected frequency;
(b) a resonator which is located on said safety equipment, said resonator comprising a ceramic crystal that is tuned to resonate at said same pre-selected frequency as said radiation wave to generate a tone;
(c) a sound receiving means which will receive said tone generated from said resonating crystal; and
(d) an alarm which is normally inactive and which is operatively connected to said transducer, said alarm remaining inactive when said resonating produced tone is received by said sound receiving means, said alarm being activated when no resonating produced tone is received by said sound receiving means.

36. The detection system according to claim 35 wherein said radiation wave is an ultrasonic wave.

37. The detection system according to claim 36 wherein said wave has a frequency between about 40 kHz and 2 MHz.

38. The detection system according to claim 35 wherein said radiation wave is an electromagnetic wave.

39. The detection system according to claim 35 wherein said ceramic crystal is barium titanate.

40. The detection system according to claim 35 wherein said ceramic crystal is quartz crystal.

41. A detection system for monitoring specified safety equipment being worn by a person who is located at a designated position for operating an electrically driven machine which requires the wearing of said specified equipment by a person who is operating said machine, said detection system comprising:
(a) a transducer which is located on one side of said designated position for emitting a radiation wave toward the opposite side of said designated position, said beam emitted at a pre-selected frequency;
(b) a resonator which is located on said safety equipment, said resonator comprising a ceramic crystal that is tuned to resonate at said same pre-selected frequency as said radiation wave to generate a tone;
(c) a sound receiving means which will receive said tone generated from said resonating crystal; and
(d) control circuitry for said machine which is operatively connected to said transducer and said sound receiving means, said control circuitry being effective to maintain said machine normally inoperative and to enable said machine to operate only when said resonating produced tone is received by said sound receiving means.

42. The detection system according to claim 41 wherein said machine has a normally open starting switch which is operatively connected to said control circuitry and wherein said transducer is normally de-energized and is energized when said starting switch is closed, said transducer being maintained energized and said machine being maintained operative as long as said resonating produced tone is received by said sound receiving means, said transducer being de-energized and said machine being rendered inoperative when no resonating produced tone is received by said sound receiving means.

43. An article of safety equipment for use in a detection system for monitoring said safety equipment being worn by persons who are passing through an entryway into a designated area which requires said persons in said area be wearing said article of safety equipment, said article comprising:
a ferromagnetic transducer which is located on said article, said transducer comprising a membrane which will become activated upon passage into a pre-selected, frequency generating magnetic field and will vibrate at said same pre-selected frequency as said magnetic field to generate a tone,
wherein the absence of said tone activates a warning system.

44. The article according to claim 43 wherein said transducer comprises a ferromagnetic material.

45. The article according to claim 44 wherein said ferromagnetic material is a mixture of ferric oxide and a plastic film.

46. The article according to claim 43 wherein said safety equipment is selected from the group consisting of protective eyewear, goggles, faceshields, respirators, dust masks, hardhats, hearing protectors, protective footwear, clothing, and combinations thereof.

47. An article of safety equipment for use in a detection system for monitoring said safety equipment being worn by a person who is located at a designated position for operating an electrically driven machine, said operation requiring the wearing of said specified equipment by said person who is operating said machine, said article comprising:
a ferromagnetic transducer which is located on said article, said transducer comprising a membrane which will become activated upon passage into a pre-selected, frequency generating magnetic field and will vibrate at said same pre-selected frequency as said magnetic field to generate a tone,
wherein the absence of said tone renders said machine inoperative.

48. The article according to claim 47 wherein said transducer comprises a membrane of ferromagnetic material.

49. The article according to claim 48 wherein said ferromagnetic material is a mixture of ferric oxide and a plastic film.

50. The article according to claim 47 wherein said safety equipment is selected from the group consisting of protective eyewear, goggles, faceshields, respirators, dust masks, hardhats, hearing protectors, protective footwear, clothing, and combinations thereof.

51. An article of safety equipment for use in a detection system for monitoring said safety equipment being worn by persons who are passing through an entryway into a designated area which requires said persons in said area be wearing said article of safety equipment, said article comprising:

a resonator which is located on said article, said resonator comprising a ceramic crystal that is tuned to resonate at a pre-selected frequency when exposed to a radiation wave to generate a tone, wherein the absence of said tone activates a warning system.

52. The article according to claim 51 wherein said ceramic crystal comprises barium titanate.

53. The article according to claim 51 wherein said ceramic crystal comprises quartz crystal.

54. The article according to claim 51 wherein said radiation wave is an ultrasonic wave.

55. The article according to claim 51 wherein said safety equipment is selected from the group consisting of protective eyewear, goggles, faceshields, respirators, dust masks, hardhats, hearing protectors, protective footwear, clothing, and combinations thereof.

56. An article of safety equipment for use in a detection system for monitoring said safety equipment being worn by a person who is located at a designated position for operating an electrically driven machine, said operation requiring the wearing of said specified equipment by said person who is operating said machine, said article comprising:

a resonator which is located on said article, said resonator comprising a ceramic crystal that is tuned to resonate at a pre-selected frequency when exposed to a radiation wave to generate a tone, wherein the absence of said tone renders said machine inoperative.

57. The article according to claim 56 wherein said ceramic crystal comprises barium titanate.

58. The article according to claim 56 wherein said ceramic crystal comprises quartz crystal.

59. The article according to claim 56 wherein said radiation wave is an ultrasonic wave.

60. The article according to claim 56 wherein said safety equipment is selected from the group consisting of protective eyewear, goggles, faceshields, respirators, dust masks, hardhats, hearing protectors, protective footwear, clothing, and combinations thereof.

61. A detection system for monitoring safety equipment being worn by persons who are passing through an entryway into a designated area which requires said persons in said area be wearing said safety equipment, said detection system comprising:

(a) a transmitter which is located at one side of said entryway for transmitting a beam of radiation toward the opposite side of said entryway, (b) a receiver which is located at said entryway for receiving said beam of radiation, and (c) an alarm which is normally inactive and which is operatively connected to said transmitter and said receiver, said alarm remaining inactive when a beam of radiation is transmitted by said transmitter and is received by said receiver, said alarm being activated when a beam of radiation is transmitted by said transmitter and no radiation is received by said receiver, wherein said safety equipment is specifically adapted to receive said radiation emitted by said transmitter.

* * * * *